Figure 1:
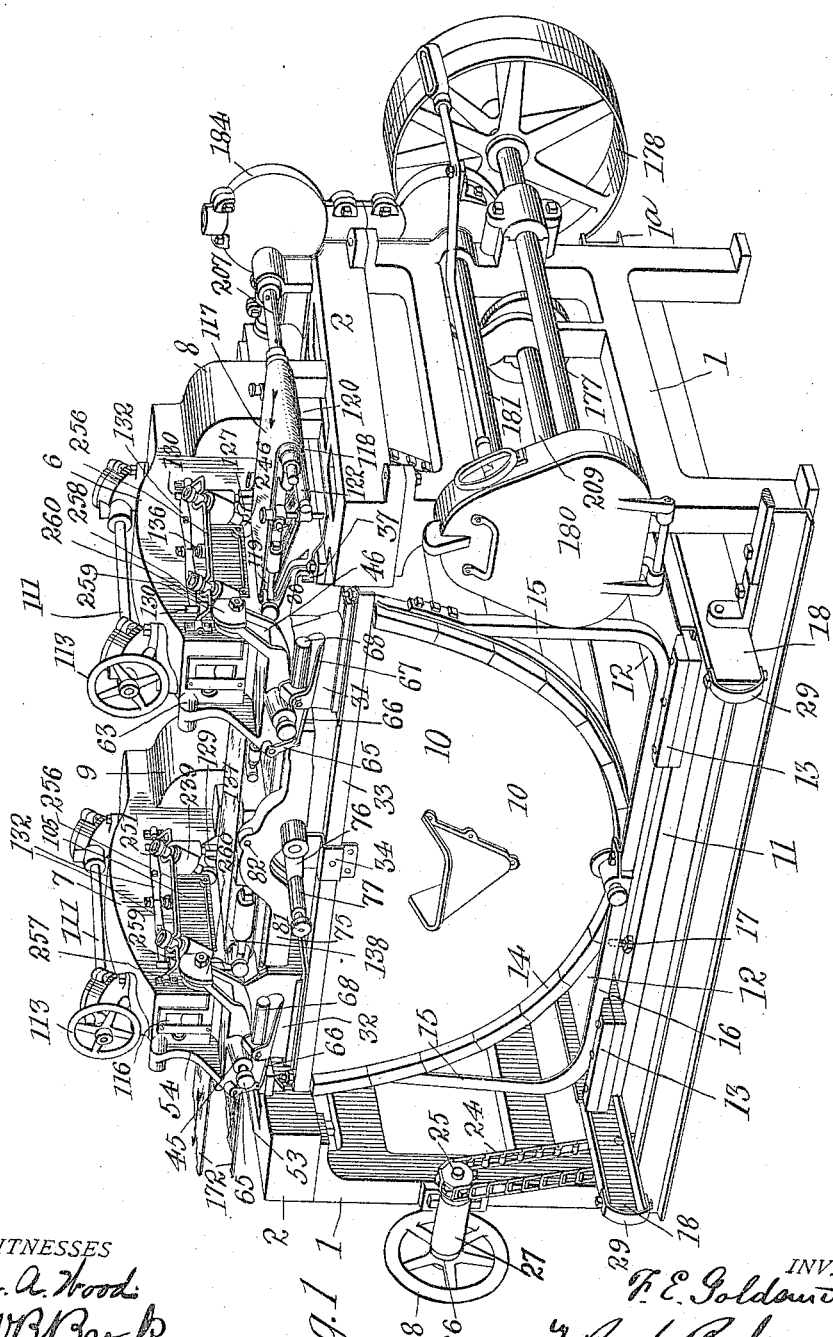

F. E. GOLDSMITH.
COATING MACHINE.
APPLICATION FILED FEB. 27, 1913.

1,184,740.

Patented May 30, 1916.
11 SHEETS—SHEET 1.

WITNESSES
M. A. Wood
W B Brock

INVENTOR
F. E. Goldsmith
by Busch, Pickens Smith
Attorney

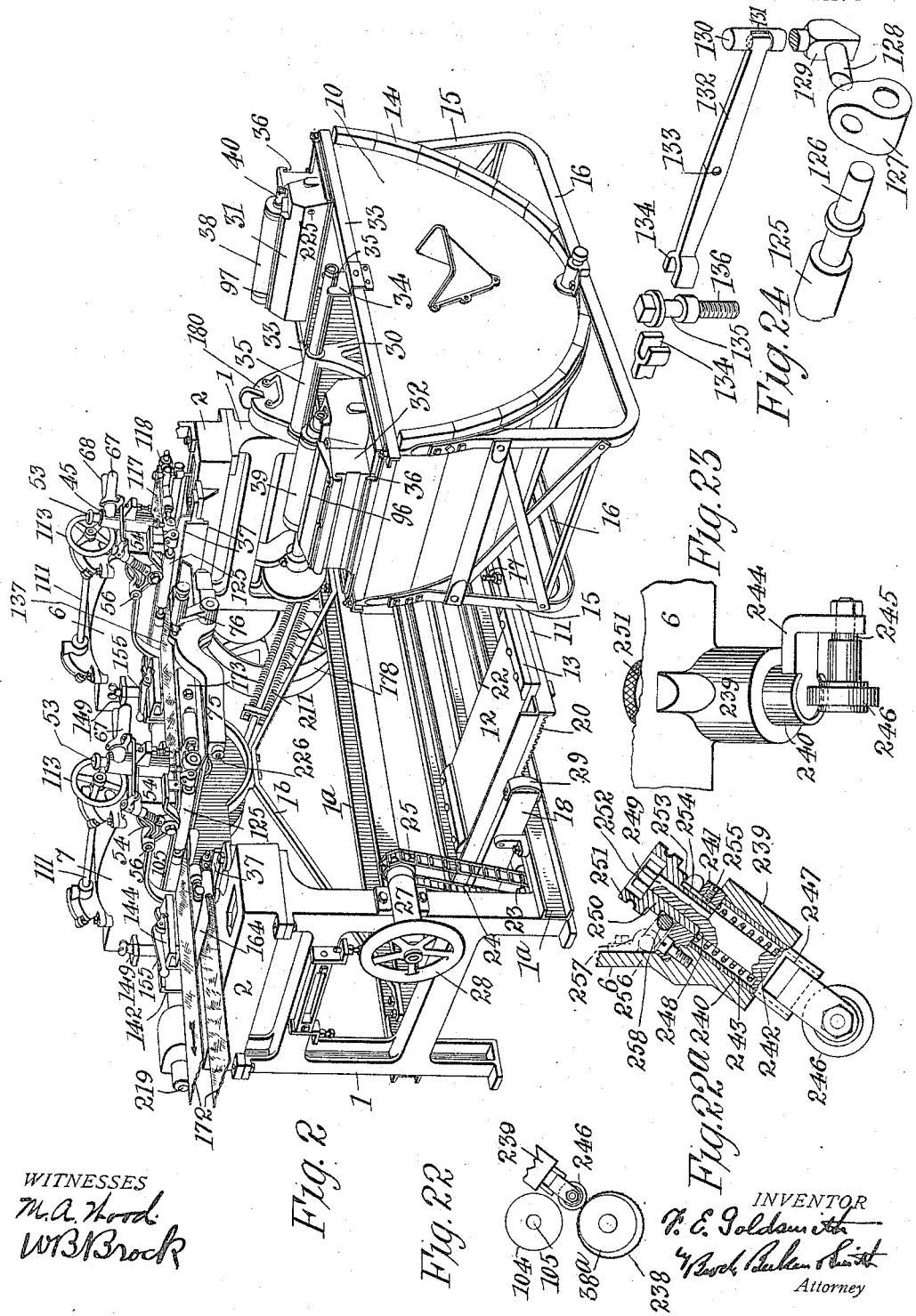

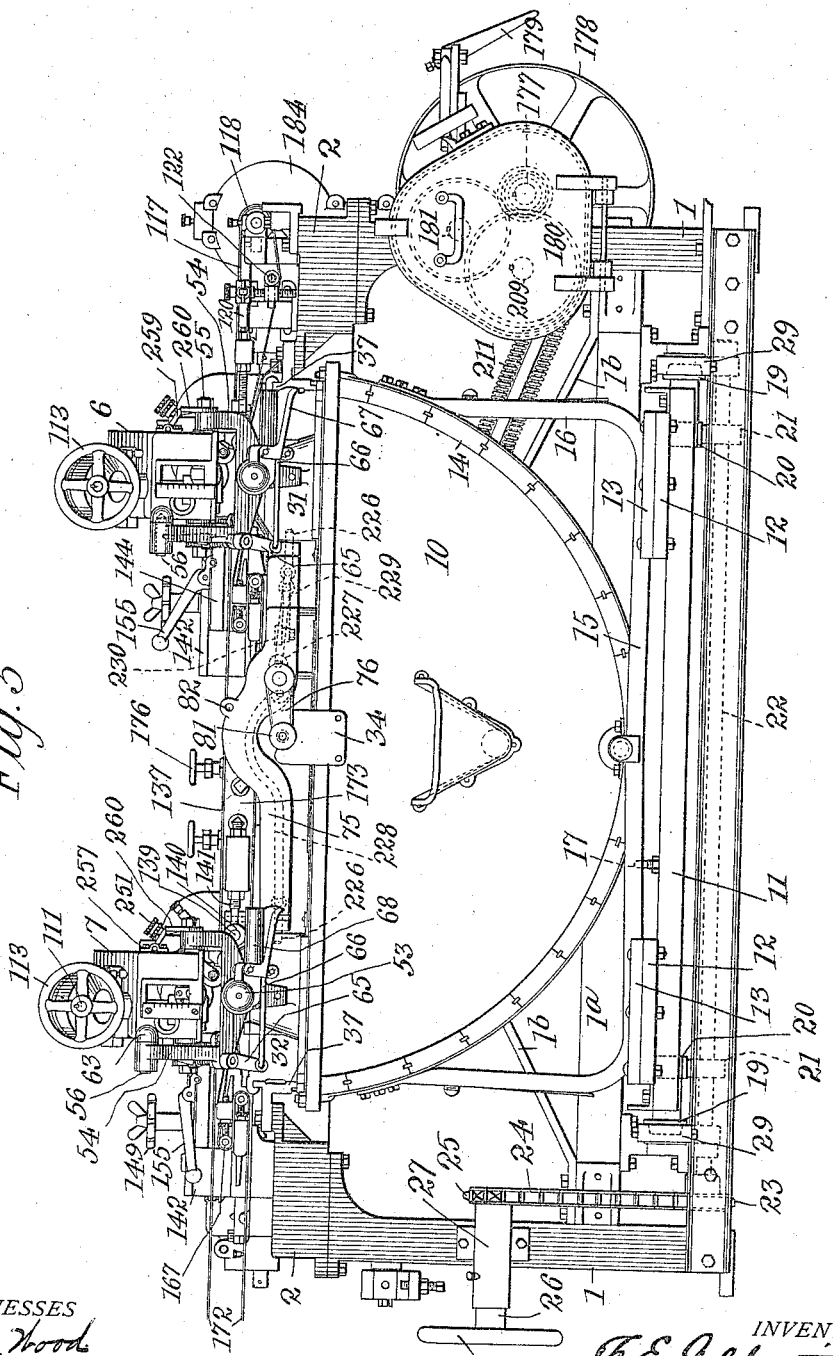

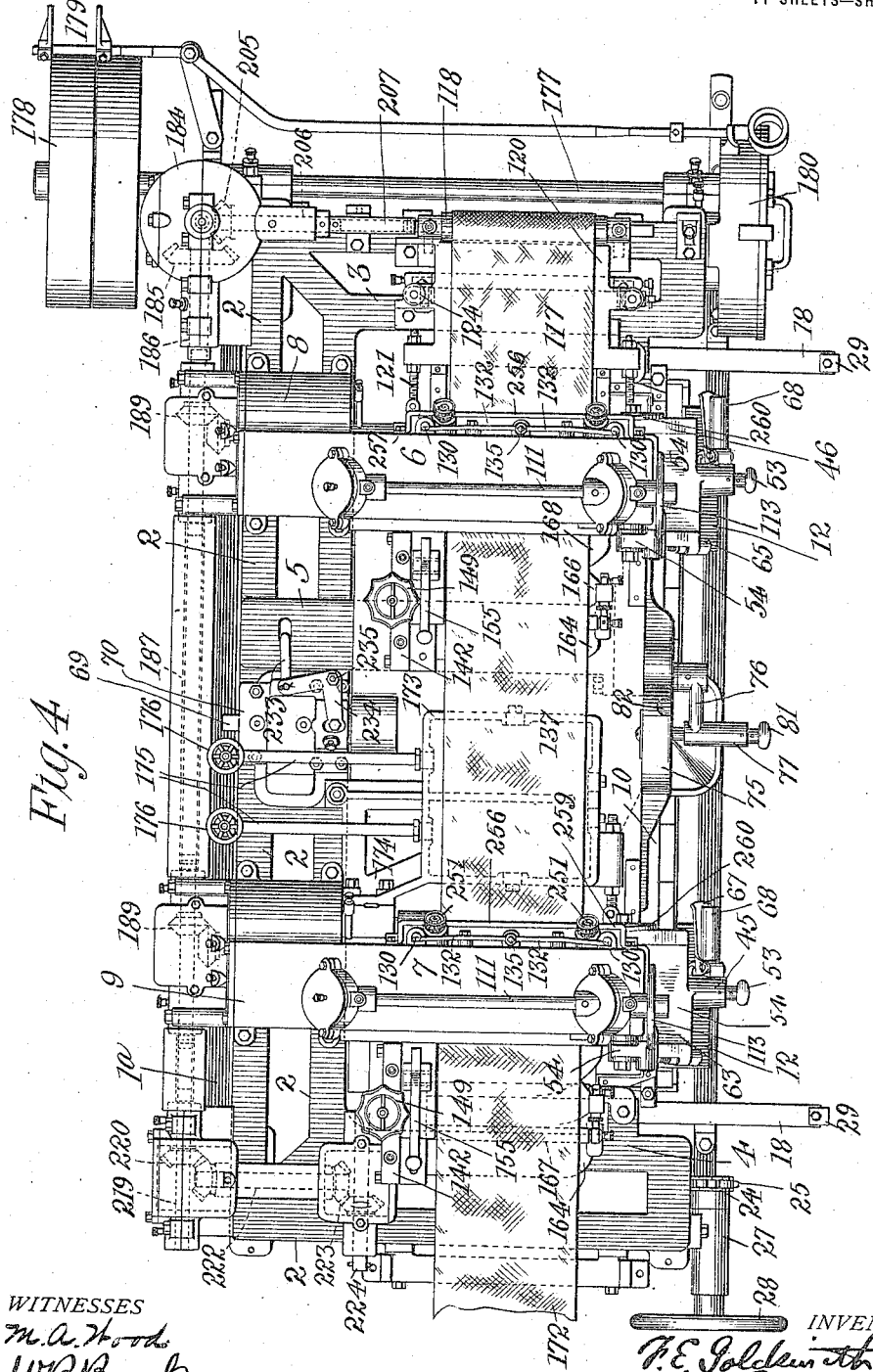

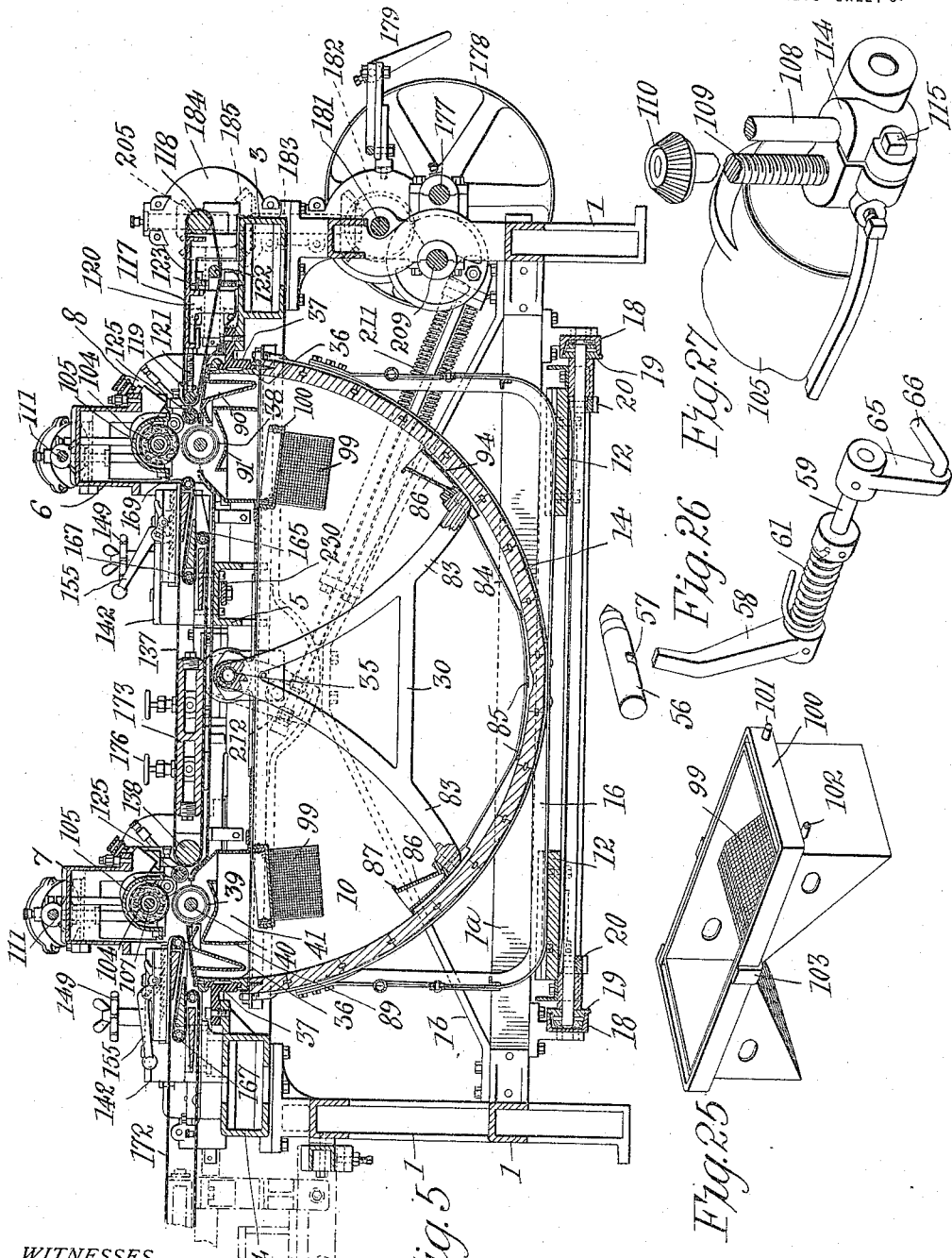

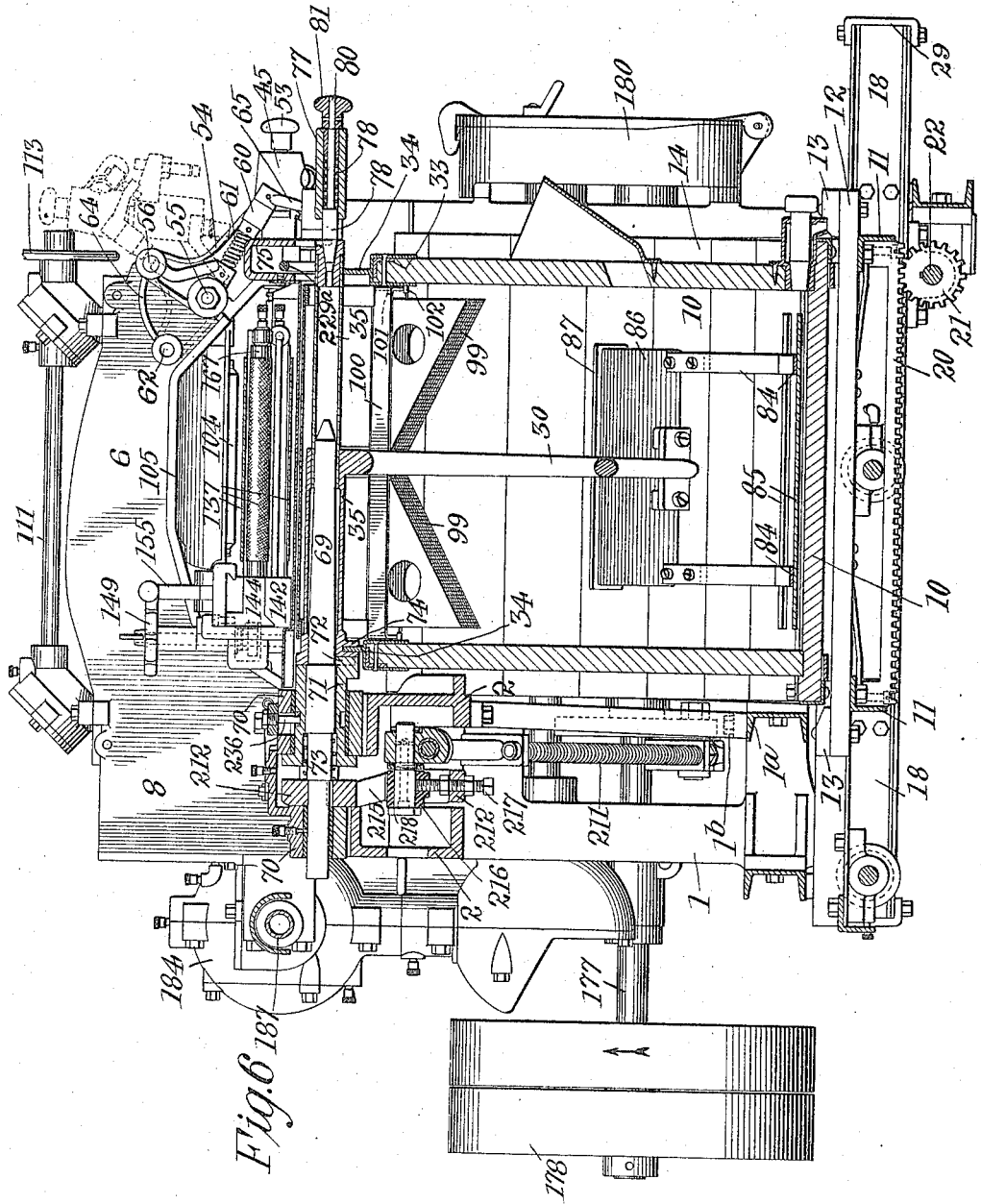

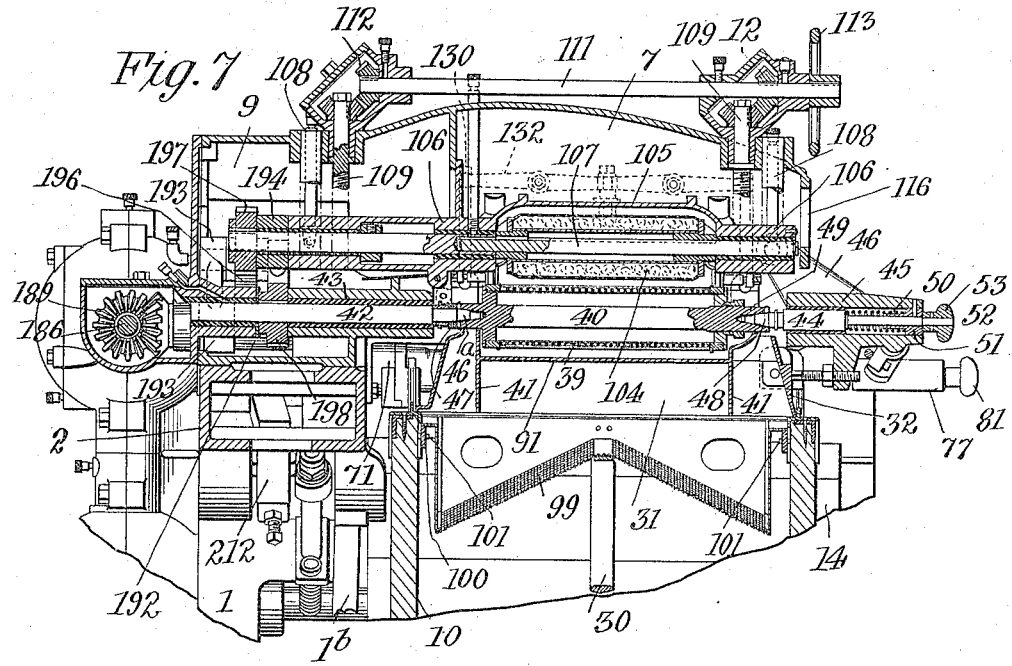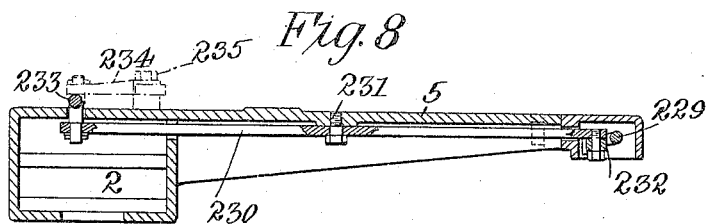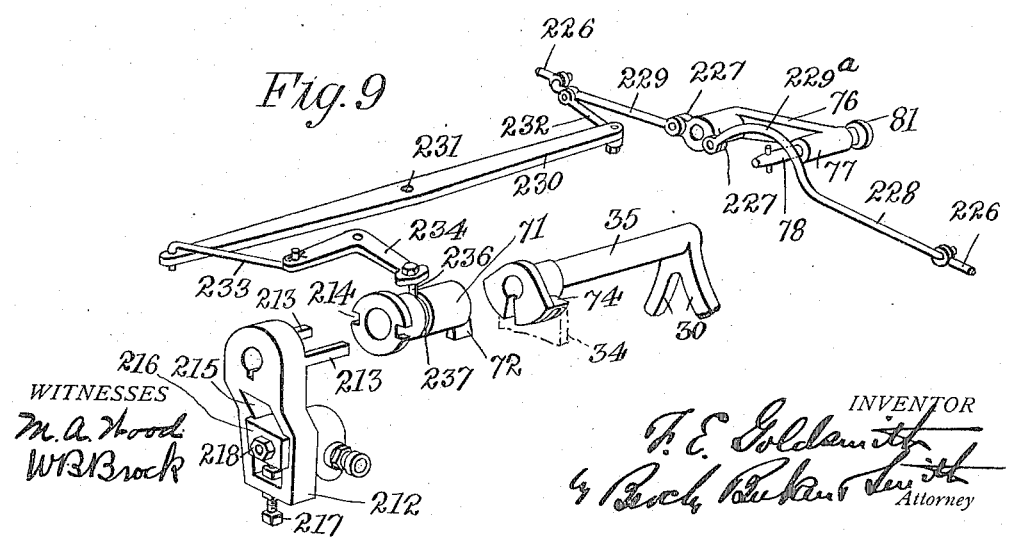

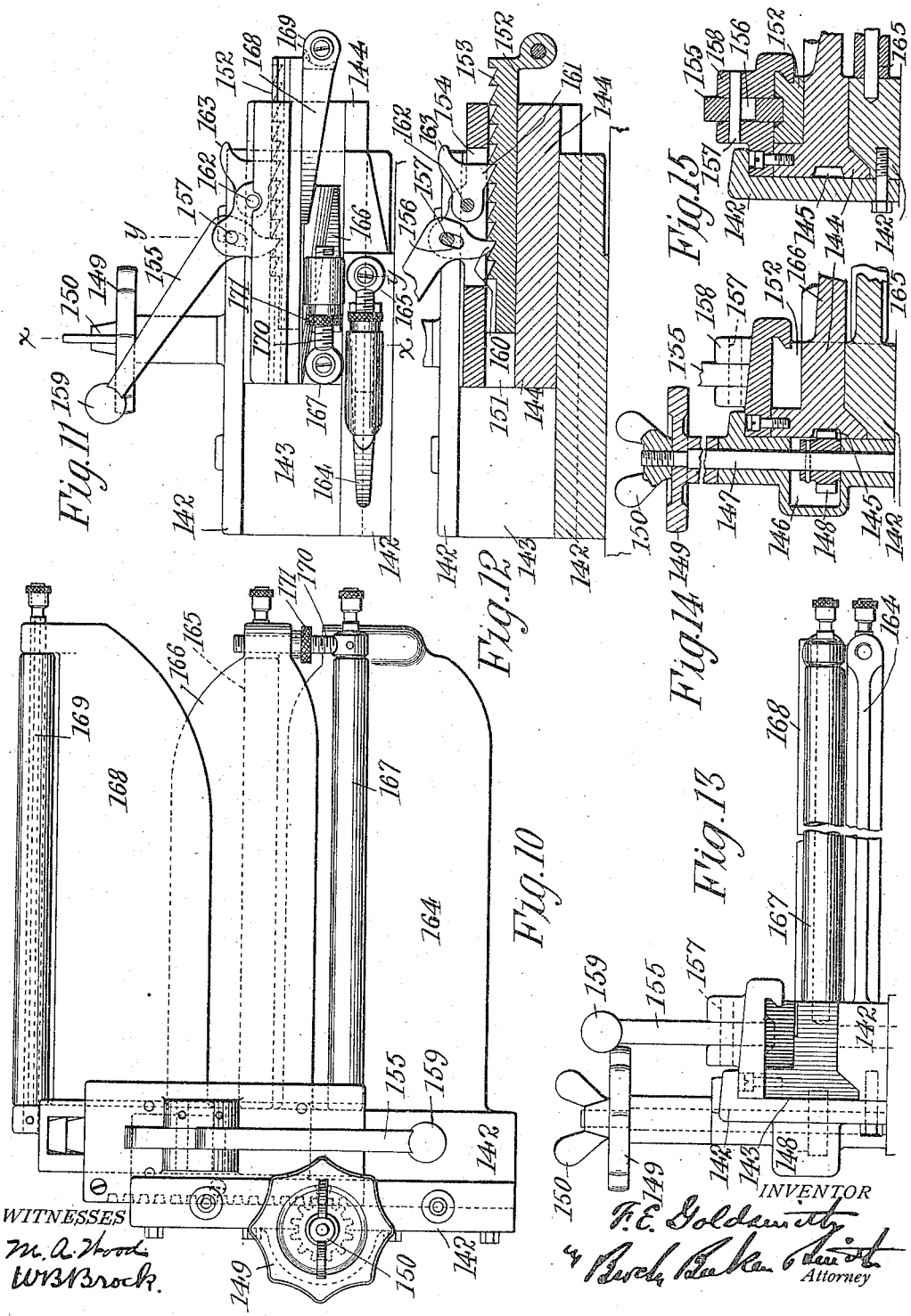

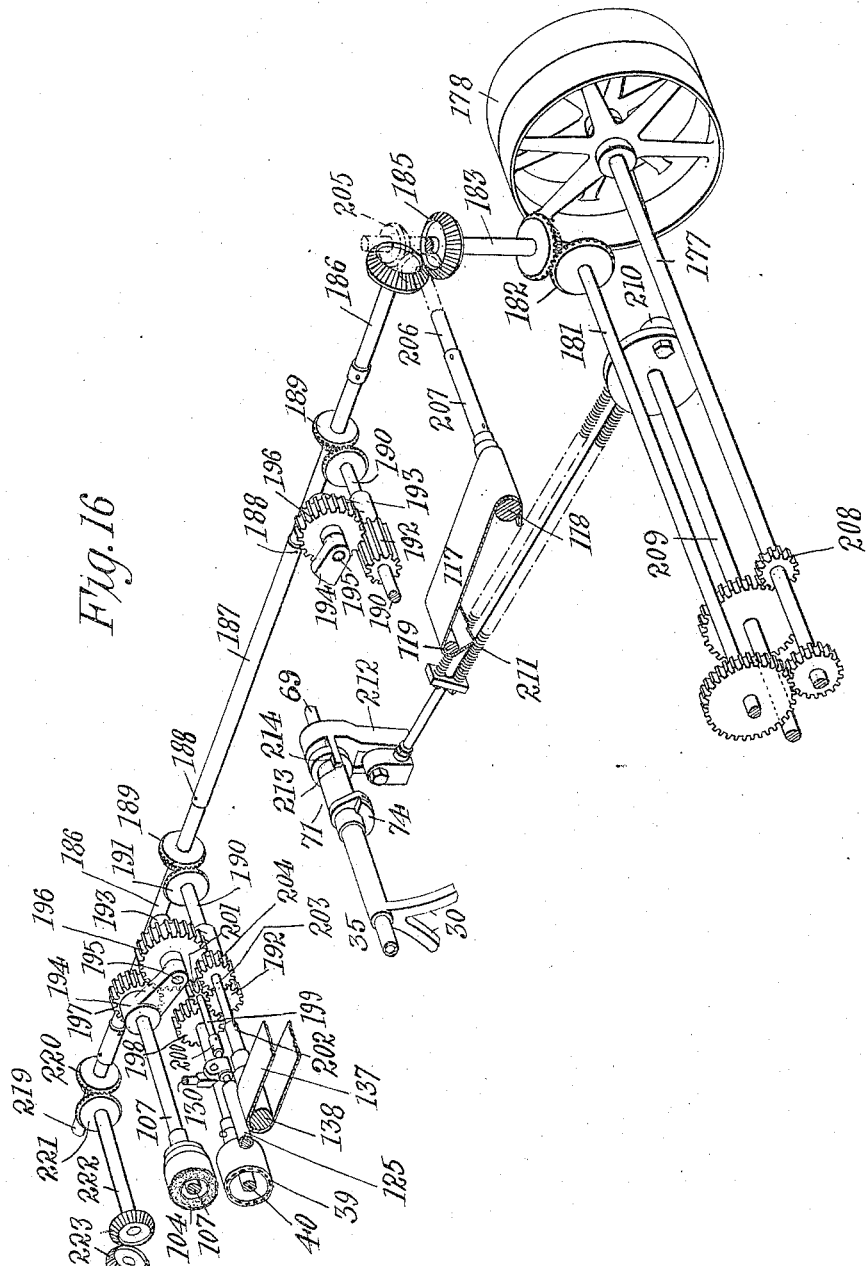

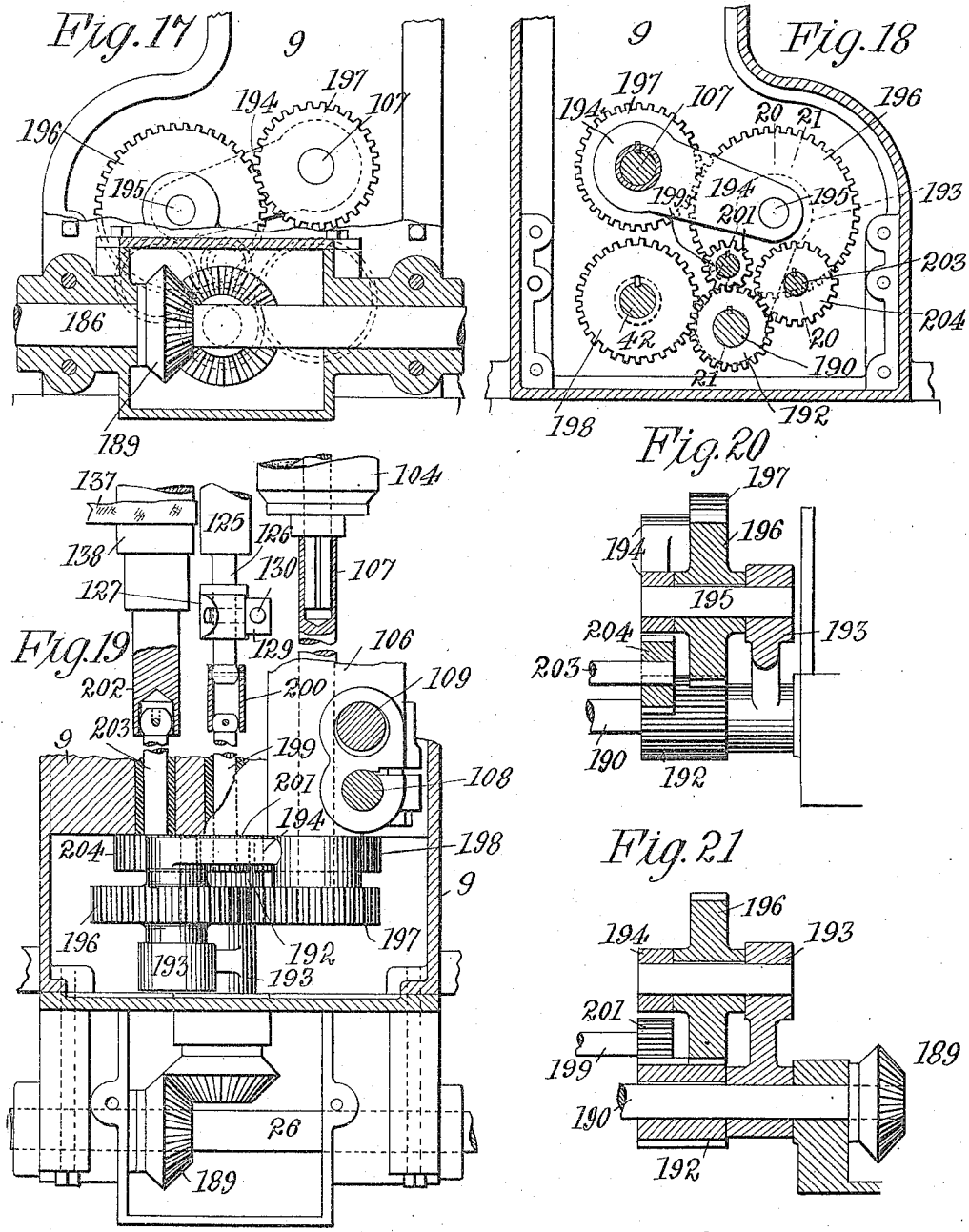

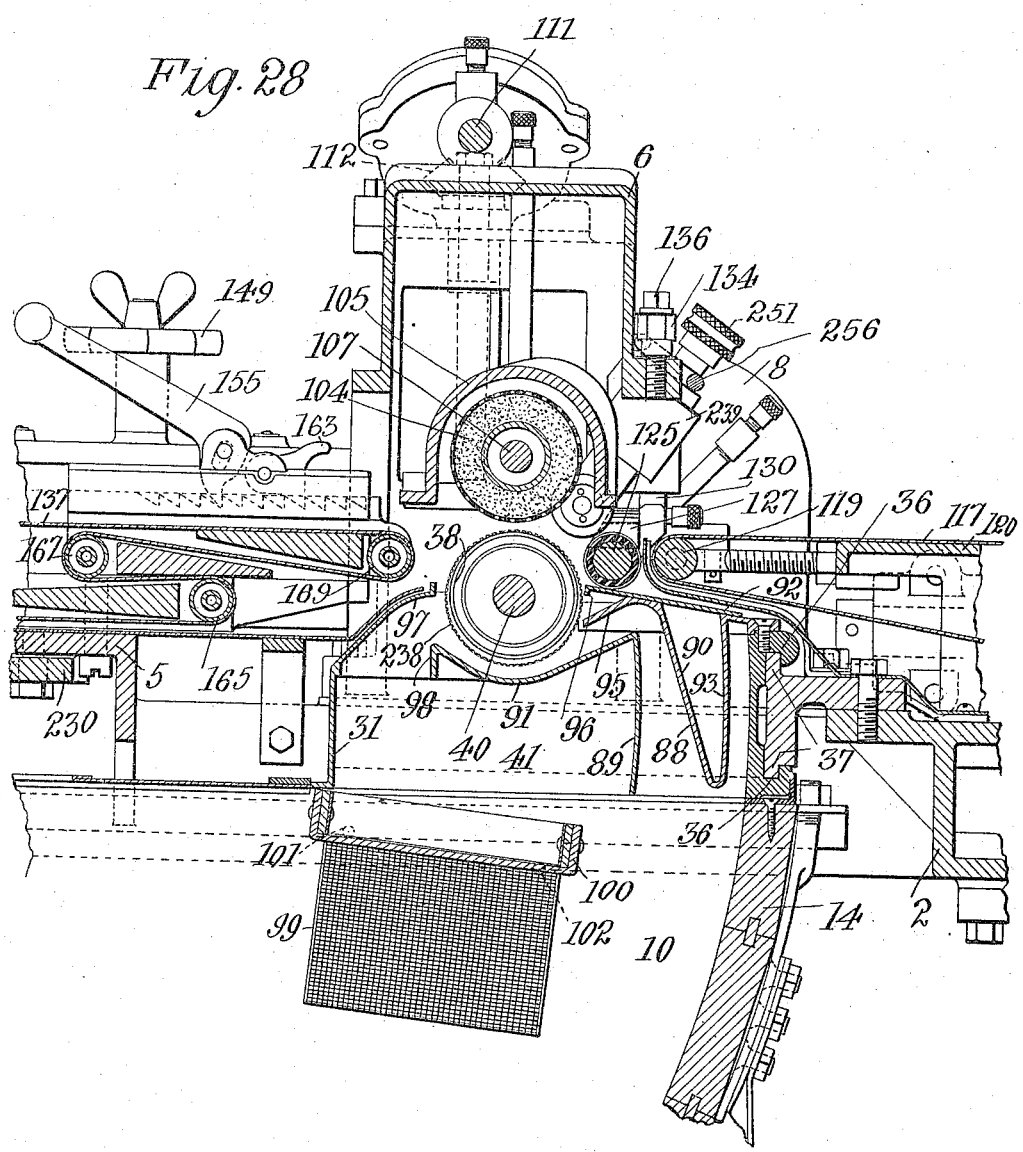

UNITED STATES PATENT OFFICE.

FREDERICK E. GOLDSMITH, OF HAMILTON, OHIO, ASSIGNOR TO CERAMIC MACHINERY COMPANY, OF HAMILTON, OHIO, A CORPORATION OF OHIO.

COATING-MACHINE.

1,184,740.           Specification of Letters Patent.      Patented May 30, 1916.

Application filed February 27, 1913. Serial No. 751,000.

*To all whom it may concern:*

Be it known that I, FREDERICK E. GOLDSMITH, a citizen of the United States, residing at Hamilton, Ohio, have invented certain new and useful Improvements in Coating-Machines for Tiles and Similar Objects, of which the following is a specification.

My invention relates to machines for coating tiles and similar objects.

One of the principal objects of the invention is to provide for very easily and quickly removing and replacing the coating reservoir, coating devices, such as coating rolls, agitator, and carrying belts. Provision for this is made by constructing the frame so that the coating reservoir may be drawn out at one side; by arranging the coating devices and belts so that they are supported or driven, or both, from one side of the frame, so that these parts may be drawn out at the open side of the frame. Movable supports are also provided for certain of the removable parts at the open side of the frame so that after the removable parts are inserted they may be properly supported.

Other objects are to interconnect the driving means with one or more of the above mentioned movable supports to prevent improper driving during removal or replacement of parts; to provide simple and effective means for supplying two coating devices from a single reservoir; to so convey and dry tiles between the two coating devices that injury to the coated surface is prevented; and to quickly and easily adjust the belts and to adapt the adjusting devices to one-side supporting arrangement.

The foregoing and other objects and advantages of the invention will be sufficiently explained hereinafter.

The invention consists in instrumentalities and combinations thereof for carrying out the foregoing and other objects, as will be explained.

The accompanying drawing shows one exemplifying structure in which the invention is embodied, but it is to be understood that the invention is capable of embodiment in many different forms.

In the drawing: Figure 1 is a three-quarter perspective of a machine embodying the invention, looking toward the front or "open" side of the frame and showing all parts in working position. Fig. 2 is a perspective from the same side of the machine but looking from the other end, the coating tub and rolls being removed, and the movable supporting devices for the removed parts being shown in unlocked position. Fig. 3 is a front side elevation. Fig. 4 is a top plan. Fig. 5 is a longitudinal section. Fig. 6 is a transverse section in the vertical plane of the agitator shaft. Fig. 7 is a transverse section of the upper part of the machine in the plane of the left-hand coating roll shaft, as shown in Figs. 3 or 5. Fig. 8 is a vertical section in the transverse plane of the machine through the part of the frame carrying the lever which connects the swinging latch for the agitator shaft with the drive clutch therefor. Fig. 9 is a perspective view of the parts employed in latching and driving the agitator removed from the machine, and placed in approximate operative relationship to each other. Fig. 10 is a top plan of one of the adjustable belt carriers. Fig. 11 is a view of the same from the side of the machine or the ends of the belt rolls. Fig. 12 is a vertical section in the longitudinal plane of the machine through the belt adjusting devices. Fig. 13 is a front end elevation of Fig. 10. Fig. 14 is a vertical section on the plane $x$—$x$ of Fig. 11. Fig. 15 is a vertical section on the plane $y$—$y$ of Fig. 11. Fig. 16 is a perspective diagram of the driving mechanism, the framework and most other parts not concerned with driving being omitted. Fig. 17 is a vertical section through a part of the driving mechanism. Fig. 18 is a vertical section of the same mechanism, looking from the opposite side. Fig. 19 is a horizontal section of part of the driving mechanism. Fig. 20 is a detail of the driving mechanism, partly in section. Fig. 21 is a sectional detail of the driving mechanism. Fig. 22 is a diagram of a modified form of coating roll in relation to one of the coating roll adjusters. Fig. 22$^a$ is a sectional detail of one of the coating roll adjusters. Fig. 23 is a perspective view of the same. Fig. 24 is a diagrammatic perspective view of the adjusting devices for one of the adjustable tile feed rolls. Fig. 25 is a perspective of one of the coating screens. Fig. 26 is a perspective detail of part of the latch-operating mechanism for the swinging coating heads. Fig. 27 is a perspective detail of part of the pressure roll adjustable mechanism. Fig. 28 is an enlarged longitudinal section of part of the tub, one of the coating housings, and adjacent parts.

Referring to Figs. 1, 2, 4, 5, and others, the frame of the machine comprises end pieces 1 carrying top piece 2, which, as best understood from Figs. 4 and 5, has in plan the form of the letter E, of which the end laterals 3, 4, rest over the vertical frame members 1 and the middle lateral 5 springs from the top member 2 intermediate the end laterals 3 and 4. The outer end, or the end of the lateral member 5 nearest to the eye in Figs. 1, 2, 3, etc., is, therefore, free and unsupported. As best understood in Figs. 4 and 5, two overhanging housing arms or beams 6, 7, are provided for the coating rolls and certain other parts. These beams have bases 8, 9, resting on the back stretch of top frame 2, one on each side of the center, horizontal member 5. These beams stretch across the machine, as shown in Fig. 4, and their outer ends are unsupported, as clearly seen in Figs. 1, 2, 3, 6 and 7. By this construction a large open fronted recess is left within the frame under the middle lateral 5 and beams 6 and 7 and between the end frame members 1, as clearly shown in Fig. 2, to receive the coating tub 10, shown in that figure pulled out and removed from its carriage and resting on the floor in front of the machine. The end and top frame members may be suitably connected at the back to form a rigid structure by braces 1ª, 1ᵇ, or the like.

Coating for ceramic articles, such as tiles, consists of a fluid carrying in suspension various finely ground, solid ingredients, which have a strong tendency to precipitate and to clog up, more or less, working parts, such as the coating devices. To provide means for readily cleaning the parts, and also to provide for changing the coating tub and coating devices and other parts when it is desired to change the character of coating material, various arrangements and combinations of parts are herein provided. As already described, the open-front tub-space in the frame accommodates the removable tub 10, and to facilitate removing and replacing the tub, a movable truck or carriage 11 is provided for it. This truck has a rectangular frame with end cross pieces 12, and these cross pieces have at each end a cleat 13. The tub, desirably, has an approximately semi-circular bottom 14, and to properly support the tub on its truck and to prevent it rolling over when removed therefrom, it is provided with a frame 15 having straight, bottom, side members 16 adapted to rest on the side members 12 of the truck and just within the cleats 13. In this way the tub is accurately located upon the truck but may be easily and quickly removed and replaced thereon without special fastening devices when the truck is in extended position, as shown in Fig. 2. To further locate the tub in the longitudinal direction of the machine, one of the frame members of the truck may be further provided with a pin 17, adapted to enter a hole in one of the tub frame members 16, as best seen in Figs. 1 and 3.

The main frame is provided with transverse rails 18 which may be in the form of a channel section, and on these rails run wheels 19 carried by the tub truck. The truck is also provided at each side with a rack 20 (Figs. 5 and 6), and these racks are engaged by pinions 21 carried on shaft 22, mounted in fixed bearings in the frame. Shaft 22 also carries a sprocket 23 (Fig. 3), and from this a chain 24 leads to another sprocket 25 on a hand-wheel shaft 26 mounted in a fixed bearing 27 and carrying a hand-wheel 28 at a convenient elevation, so that the attendant may easily run the tub and tub truck in and out by rotating the hand-wheel. The provision of two racks and pinions mounted on the same shaft insures that the truck will run evenly without binding in its guides. The provision of a channel-shaped truck also provides for the support of the truck when in extended position, as shown in Fig. 2. The outward movement of the truck is limited by end pieces or stops 29 at the ends of tracks 18.

A plurality of tubs, each provided with a frame 15, and all necessary appurtenances, such as coating rolls with their troughs and agitator, may be provided, so that a very rapid change may be made by simply freeing the tub and its associated parts from operative relation with the machine and running the tub out, lifting it off the truck, replacing it by another tub with appurtenances, running the truck back and coupling up the parts again. For this reason the tub is usually made to carry practically all parts of the machine with which coating comes in contact, so that in changing tubs all these parts are simultaneously changed and great economy of time is secured.

The appurtenances carried by the tub include (Figs. 2, 5, and others) the feeding and agitator frame 30, front coating-roll housing 31, and the rear coating-roll housing 32. For supporting these parts, the tub frame (in a preferred construction) comprises top side members 33, to which the ends of the coating housings are secured. These side members also carry tracks 34 to support the tubular shaft 35 of frame 30 when it is released from operative position.

To insure proper location of the coating housing in the machine, the outer face of each housing is provided with grooved ways 36, into which enter, as the tub is run in, rails or gibs 37 carried by the top frame member (Figs. 2 and 5). The housings are thus definitely located in the frame in respect to vertical and longitudinal position. Means for locating the housings in respect to lateral position will be later described. The coating rolls 38, 39, have shafts 40 (Figs. 2 and 7) and when the tub is run out the ends of these shafts rest in notches provided on the tops of vertical, interior walls 41 of the coating housings. The rolls are so held in correct position to be engaged by their supporting and driving bearings, and the agitator shaft 35 is also supported in position to be engaged by its supporting and driving bearings.

When the tub is in working position, each coating roll is held by a driving spindle 42 revolving in a bearing 43, and another spindle 44 which, for identification, may be called an idler spindle mounted in a bearing 45 carried by swinging head 46 mounted on each of the beams 6, 7. Fig. 7 shows the spindles and other parts adjacent to the rear roll 39, and Figs. 1, 2, 3 and 6 best illustrate the swinging heads. It is to be understood that the coating rolls and their supporting and driving devices are substantially identical except with respect to a few features of the driving mechanism, the differences in which will be later explained, and a description of one of the coating rolls and related parts will answer for both unless otherwise mentioned. Spindle 42 has a tapered end 46ª engaging a socket in the driving end of roll-shaft 40, and also has a clutch member 47 engaging clutch members carried by the shaft for driving. When the tub is run into position, the coating roll is supported, as above explained, in line with drive-shaft 42, and tapered end 46 automatically enters the shaft, and member 47 engages for driving without attention on the part of the attendant. The tub is, of course, run in while the swinging head 46 is raised, as shown in full lines in Fig. 2, and in dotted lines in Fig. 6. The swinging head is then dropped, bringing the tapered end 48 of idler spindle 44 into engagement with socket 49 in the outer end of the roll shaft. To permit this swinging engagement of the idler spindle, to allow for slight variations in length of the roll shaft, to permit proper engagement of clutch 47, and for other reasons, idler spindle 44 is yieldably held by a spring 50 engaged between a shoulder on the spindle and a plug 51 in the end of bearing 45. The spindle is further provided with a stem 52 extending through the plug and provided with a knob 53, so that the spindle may be retracted by hand to assist in engaging it with the roll-shaft as the head is swung down, or for other reasons.

The swinging head is in the general form of a yoke having arms 54 (Figs. 1, 3 and 6) embracing the end of the corresponding beam 6 or 7 and pivoted to it at 55. The heads are latched in open or closed position by pin 56 carried by a socket in one of the arms (see also Fig. 26). This pin has a notch 57 engaged by the end of one arm 58 of a bell-crank carried on shaft 59 journaled in bearings 60 on the head. The bell-crank shaft is urged by a spring 61 in the direction to engage the pin either with socket 62 or socket 63 carried by the beam. Between the sockets runs a sector-shaped rail 64 to hold the pin in retracted position between the two sockets. The other arm 65 of the bell-crank is connected by a link 66 with release lever 67 pivoted at the base of a rigidly mounted handle 68 carried by the head. To release the coating-roll, latch lever 67 is pulled while the handle 68 is grasped. This withdraws pin 56 from socket 63. An upward pull on handle 68 then swings up the head to the position shown in Fig. 2 and in dotted lines in Fig. 6. Lever 67 then being released, spring 61 throws the locking pin into socket 63. The lever may be released at any time after the pin has left one socket and then the pin will ride over the sector 64 until it engages the other. To reëngage the coating roll, the head being in its upper or free position, release lever is similarly pulled, the head swung down and again locked, the idler spindle 44 engaging the roll-shaft toward the end of this movement.

When the tub is run in, the hollow shaft 35 on the agitator frame is supported by brackets 34 in line with spindle 69 mounted in bearings 70 on the frame. This spindle is suitably tapered to easily engage the hollow shaft. Upon the spindle is mounted a slidable clutch 71 having a single tooth or jaw 72 to engage a corresponding socket in the inward end of shaft 35. Clutch 71 is urged to engagement by a spring 73. The single tooth and socket arrangement of the clutch insures that it will engage with the agitator shaft for driving only when the shaft is in proper relative position to the driving mechanism. To positively move shaft 35 in and out along with the tub, the inward bracket 34 engages with a sector slot 74 in the shaft-hub adjacent to the clutch. The tub may be run in at any time without respect to the position of clutch 71. If tooth 72 is not opposite the socket in shaft 35, the clutch will be pressed back against its spring until in the driving movement, as will be later explained, it oscillates to such a point that the tooth is opposite the socket, whereupon the tooth will spring into the socket and proper driving of the agitator and feed frame will be commenced.

For the support of the outer end of the agitator shaft, the main frame has an upwardly arched member 75 carried by the middle-lateral 5 on the top plate, and otherwise suitably supported and braced as may be necessary. At one side of the arch in this member is pivoted swinging arm 76 (Figs. 1, 2, 3, 4 and 6.) In the free end of this arm is a bearing 77 and in the bearing is an idler spindle 78 having a tapered end engaging a socket in the end of shaft 35. This spindle is urged in by a spring 79 and is provided with a stem 80 and knob 81 similar to parts already described in connection with the coating rolls. Frame member 75, as clearly shown in Figs. 1 and 4, is provided with a socket 82 to receive the end of spindle 78 when the arm 76 is in idle position. To free shaft 35 and permit the tub to be removed, knob 81 is pulled out and arm 76 swung up to the position shown in Fig. 2. The knob being released, the end of spindle 78 then enters socket 82 and the arm is then held up out of the way. When the tub is run back into place the spindle is reëngaged with shaft 35 in an obvious manner.

The coating-feed and coating-mechanism and operations will now be described: The agitator frame 30 has two arms 83 connected by straps or rods 84, and across these rods are placed agitator strips 85 close to the tub bottom. As the agitator is oscillated by the driving mehanism, as will be later described, the agitator strips are swept through the coating material near the tub bottom and keep it thoroughly stirred and mixed. Across each of the arms, at the outside, is placed a feed scoop or bucket 86, preferably of fairly deep V-shape, as shown, and provided with outer lips or flanges 87. These buckets alternately dip into the coating material and elevate it to the coating devices. In so doing they at the same time assist greatly in the stirring of the mixture. Each coating housing 31 is provided with a bucket-well or passage 88 open at the bottom and defined by the outer wall of the housing and an inner, approximately vertical wall 89. Within this well is a device 90 which may be identified by the name "discharger," adapted, as the bucket rises, to enter into it and to cause the discharge of the contained coating fluid. This fluid is received by a pan or trough 91 below the coating roll. To prevent improper escape of the coating material, the space between the discharger and the outer wall of the housing is closed at the top, as indicated at 92; and to cause most of the material to be discharged toward the coating roll, the outer wall 93 of the discharger is made to fit quite close to the outer wall 94 of the bucket. More clearance may be left between the inward wall of the discharger and the adjacent side of the bucket. To prevent upward escape of the coating material and to direct it into the pan, there is, continuous with the discharger, an inwardly-directed flange 95 extending over and downward toward the pan and fairly close to the coating roll. To further prevent upward splashing of coating material which might pass flange 95, there is a guard or cover 96 somewhat above said flange and as close as practical to the coating roll. On the opposite side of the coating roll, the wall of the housing extends upward and inward fairly close to the roll, as indicated at 97.

In coating, the coating rolls are continually rotated and the feed and agitator frame is continuously oscillated so that at regular intervals one of the buckets 86 rises toward the corresponding discharger 90 carrying a load of coating fluid, and this is squeezed out by the discharger into pan 91, wherein the coating roll dips and carries up a suitable quantity of coating material to be deposited upon the tiles. Excess material flows away from the pan over its edge 98 and is to be screened before it returns to the tub to remove undesirable substances, such, for instance, as fragments of tiles, which may drop into the pan. For this purpose, below the discharge edge of each pan is placed a screen 99 carried by a frame 100. At one side the screen is pivoted to the tub frame by trunnions 101, and the other side of the frame is loosely supported on the tub frame by pins 102. The screen is V-shaped in end elevation, as clearly shown in the perspective view 25, and at the center of the V there is a transverse wearing plate 103 bridging the screen frame. As the agitator rises toward one of the screens, the agitator arm 83 strikes the wearing plate 103 and slightly raises the screen, and when the agitator again recedes, the screen is dropped upon pins 102 and sufficiently jolted to keep it clear and permit the free flow of coating material through it back to the tub.

The buckets usually supply coating to the pans considerably in excess of the amount required for use, and the pans are thus continuously flushed out with fresh material and the coating available for application to the tiles is, therefore, always in the best condition.

Above each coating roll is placed a pressure roll 104 to apply suitable pressure to the tiles as they pass for coating (see Figs. 5, 7, and others). Each pressure roll is carried in a housing 105, in the ends of which are provided bearings 106 for the roll-shaft 107. For the adjustment of the pressure roll the housing is arranged to slide up and down on posts 108 (see also Fig. 27). At each end of the housing there is a rotatable screw 109 engaging a part of the housing. These screws are suitably journaled in the corresponding beam 6 or 7, and at their upper ends carry bevel pinions 110. Each beam also carries a transverse adjusting shaft 111 provided with bevel pinions 112 to engage pinions 110, and the shaft is also provided with a hand-wheel 113 for rotating it. The housing may be locked in adjusted position by means of a split sliding bearing 114 engaging the outer one of posts 108, and a set screw 115 to clamp the bearing upon the post. This screw is accessible through a hole 116 in the outer end of the beam.

Driving means for the pressure roll adapted to accommodate its vertical adjustment will be later described.

Tiles are supplied to the first coating roll 38 by a feed belt or apron 117 passing over a drive pulley 118 and an adjustable idler pulley 119. The upper stretch of this belt runs over plate 120 and adjustment of the idler pulley is effected by screws 121 engaging the plate and carrying the pulley bearings at their outer ends (see Figs. 4 and 5). This belt is tensioned by a tension pulley 122 engaging the lower stretch, screws 123 engaging the pulley bearings and hand wheels 124 for the screws. Between the delivery end of the belt and the coating roll is a vertically-adjustable tile-engaging roll, which may be identified by the name "tilting" roll 125, the adjustment devices for which are shown in diagram in Fig. 24, and in assembled position in Figs. 1, 4 and 7. The roll shaft 126 rotates in bearing blocks 127 and these in turn are carried by pins 128 on vertically adjustable members 129. These members carry upwardly extending pins 130 having notches 131 to receive the outer ends of adjusting levers 132. These levers are fulcrumed at 133 to the beam, one at each side. The inner ends of the levers are provided with forks 134 which engage an annular groove 135 in adjusting screw 136, screwed into the beam. By properly rotating this screw, both ends of the roll shaft are equally raised or lowered to regulate the angle of the tile as it is delivered to the coating device.

Between the two coating rolls is a belt 137 to carry tiles from the first coating device to the second. The rearward end of this belt is carried by a drive pulley 138 adjacent to the tilting roll 125 of the second coating device. The shaft 139 of this pulley rotates in bearings 140 adjustably carried by screws 141. The screws are in turn supported by a stationary part of the machine, such, for instance, as the heater, located between the upper and lower stretches of the intermediate belt 137, and which will later be described. By means of these screws the position of the drive pulley 140 in relation to the second coating device may be regulated, and also the angle of the pulley in a transverse direction may be slightly varied to make the belt run true. The forward end of this intermediate belt, that is the end adjacent to the first coating device, is carried adjustably, both as to position and tension, by adjusting mechanism shown in Figs. 10 to 15 inclusive. This comprises a block-like member 142 carried by the frame top plate at the rear side of the belt. In this is a longitudinal slideway 143 and in this is mounted a slide 144. The rear face of slide 144 is provided with a rack 145, and opposite this rack at one point, block 142 has a recess 146 intersected by vertical adjusting shaft 147. On this shaft, in the recess, is pinion 148 engaging the rack. On the upper end of shaft 147 is an adjusting hand-wheel 149 and winged, lock-nut 150. Slide 144 also has a guideway 151, and in this is mounted a movable head 152 having on its upper face a ratchet rack 153. Above this ratchet, slide 151 is provided with a slot 154. A tension adjusting lever 155 is pivoted by means of a slot 156 upon pin 157 supported by ears 158 at each side of slide slot 154. The upper end of the lever has a hand-knob 159, and the lower end is provided with a pawl 160 engaging ratchet rack 153. In slide slot 154 is also mounted a retaining pawl 161 pivoted on pin 162. This pawl has a finger-piece 163 for convenient releasing. Extending from block 142 is an apron 164, the outer end of which supports the outer end of the shaft of fixed belt pulley 165. The inner end of this pulley is supported by block 142. Slide 144 carries an apron 166, the outer end of which supports the outer end of movable belt pulley 167. The inner end of this pulley is supported by the slide 144. Movable head 152 carries an apron 168 supporting the outer end of movable belt pulley 169, the inner end of which is carried by the head. Fig. 5, taken in connection with Fig. 11, shows the operative features of the construction just described. Pulley 165 is always in fixed position. The belt passes under and around this pulley, back and around pulley 167, forward again and around pulley 169, and so back on its upper stretch to the drive pulley 138, previously mentioned. The position of the front end of the belt as determined by the position of pulley 169 may be varied to bring the receiving end of the belt closer to the coating roll 38, or farther away from it, without varying the tension of the belt, by rotating hand-wheel 149. This moves slide 144, upon which head 152 carrying pulley 169 is normally rigidly fixed. The differential effect caused by the simultaneous movement of the two pulleys 169, 167, thus has no effect upon the length of the belt, the slack created at one point being taken up at another. To vary the tension of the belt, however, it is only necessary to manipulate pawl-lever 155 and detent pawl 161. To tighten the belt, the lever handle is simply depressed, causing pawl 160 to force the movable head forward one notch at a time, the head being prevented from returning by a detent pawl 161. To loosen the belt, it is only necessary to slightly press upon the adjusting lever, whereupon detent pawl may be raised, and when the adjusting lever is released the head may then go back to any extent desired. In this way, the intermediate belt may be practically immediately slacked off to remove it from the machine for cleaning, as sometimes becomes necessary. It will be observed that, as above described, the belt pulleys are all supported from the rear side of the machine, thus, although the drive pulley 138 has an outward bearing carried by the heater, the heater is supported only at its rearward side, and the front end is free from the machine. Similarly, the pulleys 165, 167 and 169 are all supported from the rear, and although the aprons extend from rear supports between stretches of the belt and carry the outer ends of the pulleys, these aprons are in turn all supported at the rear and their front ends are free. Therefore, when the belt is slacked off, it may be easily pulled out and as easily replaced and properly tensioned by simply stepping up the ratchet 153, as previously described.
In order to insure straight running of the belt in connection with adjustment of drive pulley 138 previously described, the outer ends of pulleys 165, 167, are connected with their respective supports by screws 170 (Figs. 10 and 11) and nuts 171. By this means the angle of the pulleys may be slightly changed for the purpose mentioned.

The rear or carry-off belt 172 takes tiles from the rear coating roll 39 and delivers them in any desired way, and the receiving end of this belt may be provided with adjusting mechanism substantially similar to that previously described in connection with belt 137.
Without means to prevent it, the moist coating on tiles passing from the front coating roll would adhere more or less to the intermediate belt 137, and this adhering coating would damage the coated faces of subsequently coated tiles. To prevent such adhesion, there is preferably provided between the upper and lower stretches of belt 137 a heater 173 (Figs. 4 and 5). This may vary greatly in character. For instance, an electric heater may be employed. But in the embodiment shown, the heater consists in the steam-box supported from the rear by a bracket 174 and provided with suitable supply and return steam pipes 175 and valves 176. The belt passing close to the steam chest is kept sufficiently dry, and in this way adhesion of coating is prevented.

The driving mechanism will now be described. One of the end frame members carries main shaft 177 on which are fast and loose pulleys 178 for driving from any suitable source. A belt shifter 179 is arranged in connection with the pulleys. At the front of the machine, in gear box 180, are changeable gears connecting main shaft to drive-shaft 181. In a gear box at the rear side of the machine, shaft 181 is connected by bevel gears 182 with vertical shaft 183. In a gear box 184, this vertical shaft is connected by bevel gears 185 with longitudinal shaft 186. This leads to the rear of the machine, there being interposed between the two coating devices, however, a flexible section 187, consisting of a tube fitting with slight looseness on solid parts of the shaft and connected to them by pins 188, whereby slight disalinements of the shaft sections are compensated for without any bad effects. Both the coating devices, including the tilting roll of each, and the drive pulley 138 of the intermediate belt, are driven from this longitudinal shaft 186. The driving parts and arrangement for the forward coating roll and tilting roll are the same as for the rear, with the exception that adjacent to the rear coating driving mechanism provision is made for driving the just mentioned belt pulley 138. The driving parts for the rear coating device are therefore fully shown in the diagrammatic Fig. 16, while the parts for the forward coating device are only partly indicated, for the sake of greater simplicity and clearness. For each coating device, then, there is on shaft 186 a bevel gear 189, driving a transverse shaft 190 through bevel gear 191. On shaft 190 is a long pinion 192. Pivoted on shaft 190 is arm 193. Adjacent to this, and pivoted on shaft 107 of pressure roll 104, is an arm 194. The free ends of these two arms carry a shaft 195, on which is mounted what may be described as a floating gear 196. At one side this engages with the long pinion 192 on shaft 190, and on another side, in turn, engages a pinion 197 on pressure roll shaft 107. As the pressure roll is vertically adjusted by means which have been previously described, it is at the same time driven in any position from shaft 90 by floating gear 196, which is kept in proper position to drive gear 197 from pinion 192 by the pivoted arms just above mentioned.

The coating roll drive-spindle 42, as shown in Fig. 7, extends toward the rear of the machine and is provided with a pinion 198 engaging pinion 192. This is the drive for the coating roll. Tilting roll 125, which, as previously described, is vertically adjustable, is connected with a non-adjustable shaft 199 by a universal coupling 200, similar to coupling 187 previously described in connection with shaft 186. In this way, while the axis of 199 is stationary, the tilting roll may be adjusted vertically and still be properly driven. Shaft 199 is provided with a pinion 201 engaging pinion 192, and in this way the tilting roll is driven. Intermediate belt drive pulley 138 is connected by a universal coupling 202 with non-adjustable shaft 203, and in this way the adjustment of the drive pulley is permitted without interfering with its drive. Shaft 203 is provided with a pinion 204 engaging pinion 192 and in this way the intermediate pulley is driven.

Returning to vertical shaft 183: Within gear box 184 this carries a bevel pinion 205 engaging a similar pinion on a lateral shaft 206, mounted in a fixed bearing. This is connected by a universal coupling 207 with the end of the shaft of front belt drive pulley 118.

Returning to the main drive shaft 177: This is provided within gear box 180 with changeable gears 208 driving transverse shaft 209, at the rearward end of which is a crank-pin 210. From this a yieldable pitman 211 drives crank 212 mounted on agitator drive spindle 69 (see Fig. 6). The hub of this crank carries two forwardly projecting splines 213 engaging splineways 214 in clutch 71, previously described. By this means the agitator clutch 71 is caused to continuously oscillate in accordance with rotation of shaft 209, and at the same time the engaging and disengaging movement of the clutch previously mentioned is permitted.

Adjustment of the pitman-stroke is effected by providing in the crank 212 a slot 215, and in this slot a bearing block 216 is mounted and adjusted vertically by a screw 217. In this bearing block is a bearing pin 218, to which the forward end of the pitman 211 is connected. The details of construction of the yieldable pitman are not a part of this invention. This yielding feature is desirable to prevent breakage of the parts if there is any obstruction to the movement of the agitator frame.

At its rear end, longitudinal shaft 186 carries an extension 219 on which a bevel gear 220 drives similar gear 221 on transverse shaft 222, and this in turn is connected by bevel gears 223 with a longitudinal shaft 224 extending rearward to drive the carry-off belt 172 from its rear end. The details of the drive of this carry-off belt may vary considerably and are not a necessary part of this invention.

It has previously been explained how the coating housings on the tub are interlocked with the main frame of the machine in respect to the vertical and longitudinal position of the machine when the tub is run in. Means for locking the coating housings and, through them, the tub, in respect to the transverse direction of the machine, will now be described: Near their outer ends the coating housings carry on their inner faces sockets 225 (see Figs. 2, 3 and 4). Frame piece 75 carries at each end a locking bolt 226 movable in and out in a socket in the frame piece (see also Fig. 9). When the tub is in operative position, these bolts are extended into sockets and prevent improper lateral movement of the tub and its appurtenances in an obvious manner. The bolts are arranged to be automatically withdrawn when the agitator shaft is released, by swinging up arm 76, previously described. For this purpose the hub of arm 76 is provided with ears 227. From one of these ears a link 228 runs to one of the bolts 226. This link is upwardly arched at 229$^a$ to conform to the arch of frame piece 75 and to avoid interference with the agitator shaft and its brackets when the tub is withdrawn. The other ear 227 is connected with the other bolt by a link 229. These links are carried within a channel section of frame piece 75. Evidently, when arm 76 is swung up, after releasing spindle 78 from the agitator shaft, links 228 and 229 are moved so as to withdraw the bolts from sockets 225, and the tub is then released for withdrawing. Similarly, restoration of arm 76 to operative position again locks the tub and the movement of the arm to operative position evidently cannot be accomplished until the tub is in proper position with the sockets in line with the bolts.

An interconnection between the arm 76, the tub locking means, and clutch 71 of the agitator drive, is provided as follows: Transversely arranged under frame piece 5 (see also Fig. 8) is a lever 230 fulcrumed at 231. The outer end of this lever is connected by a link 232 with link 229 previously mentioned. The inner end of the lever is connected by a link 233 with one arm of clutch-operating bell-crank 234, best shown in Figs. 4, 8 and 9. This bell-crank is fulcrumed at 235. The other arm of the bell-crank carries a stud 236 extending down through a slot in the frame and engaging an annular groove 237 in clutch 71. When arm 76 is swung up through the linkages and lever 230, and bell crank 234, clutch 71 is moved back against its spring, freeing the agitator shaft 35, and no improper driving of the agitator and feed mechanism can, therefore, be accomplished until all parts are restored to operative condition.

Fig. 22 shows diagrammatically a modified form of coating device. In this, the ordinary coating roll is replaced by a core 38$^a$ on which hangs a loose eccentric sleeve or shell 238. Adjusting devices, shown in enlarged detail in Figs. 22$^a$ and 23, are employed to regulate the angular position of this shell. The adjusters are shown in assembled position in the machine in Figs. 1, 4 and 5. They comprise tubular sockets 239 carried by beams 6, 7, in which are fitted sleeves 240. The tops of the sockets are provided with caps 241 secured to the beams. Within sleeves 240 are slidable heads 242 pressed outward by springs 243 engaging between the heads and caps 241. At the ends of the heads are elbowed arms 244, the ends of which carry, upon stud shaft 245, adjuster rollers 246 adapted to engage shells 238 of Fig. 22. The sleeves 240 are provided at their ends on one side with slots 247 to accommodate and guide arms 244. Heads 242 are provided with stems shouldered at 248 and extending with reduced diameter through caps 241. Surrounding the smaller parts 249 of the stems are sleeves 250 provided at their outer ends with recessed, enlarged knurled heads 251. These headed sleeves are secured rotatably against shoulders 248 by nuts 252 on the ends of the stems. The sleeves are also provided with annular shoulders 253 and below these shoulders there are cut longitudinal slots 254 entered by the ends of screws or studs 255 in caps 241.

Two adjusters constructed as described are provided for each coating roll, one being located near each end of the roll, as shown in the assembly views just mentioned. In the position of parts shown in Fig. 22ᵃ, springs 243 urge the adjuster rolls 246 into engagement with coating rolls 238. If it is desired to run the coating shells without adjusters, or if ordinary rolls are to be used, as shown in the assembly views, the adjusters are retracted by pulling up knurled heads 251 until the heads of sleeves 250 are above studs 255. Thereupon, the knurled heads are rotated slightly, bringing the slots 254 out of register with the studs, which then engage under the ends of sleeves 250. The adjuster rolls 246 are held retracted and out of engagement with the coating devices. The retraction of the adjusters may be effected by hand manipulation of each one, but for greater convenience and also to provide for automatic withdrawal of the adjusters when the coating devices are to be withdrawn from the frame, means are provided for simultaneously withdrawing both of the adjusters when the movable head for the corresponding roll is lifted to release the roll. Such means consists of transverse rods 256 pivoted to the beams in bearings 257. These rods are bent to form loops 258 partly surrounding each of the sleeves 250 just beneath shoulders 253. Each rod also has a part 259 overlying the cam 260 carried by the adjacent head 54 and centered upon the pivot axis of the head. Now, evidently, when the head is raised, cam 260 will raise rod 256 and thereby retract both of the adjusters and will hold them retracted as long as the head is raised. When the head is lowered to active position, both the adjusters are permitted to return under the impulse of their springs. But, of course, at any time the adjusters may be locked out of action so as not to get in the way when ordinary concentric coating rolls are used by hand manipulation, as above described.

The principal object of this invention, as will be understood from the foregoing description, is to provide a machine that will deposit two coatings upon a tile as the tile is passed once through the machine. In this way a heavy total coating may be applied if necessary, and if a moderately light total coating is applied it may be of better quality than when the total coating is applied by a single coating device.

I have discovered that two coatings applied successively to a tile will make a better product than one heavier coating. To make the machine as simple as possible, it has been designed to arrange the coating supply in such a manner that one tank and pumping or feeding device will supply glaze or coating to both coating elements. To make the machine more or less "universal" in its work the tank and all the coating supply parts are made removable for washing or for supplying duplicate parts for a different color or composition of coating matter.

Many changes in structural features may be made without departing from the principles of my invention.

I claim:—

1. In coating mechanism for tiles and the like, in combination, a frame open at one side, object feeding mechanism on the frame, a coating receptacle located within the frame, and means for inserting and removing the receptacle through the open frame side, a coating device, idle supports therefor upon said receptacle and quickly attachable drive supports for the coating device upon the frame.

2. In coating mechanism for tiles and the like, in combination, a frame, object feeding mechanism thereon, a coating receptacle, a coating device, a fixed support at one side of the frame for the coating device, and a movable support at the other side of the frame for the coating device.

3. In coating mechanism for tiles and the like, in combination, a frame, object feeding mechanism thereon, a coating receptacle, a coating device, a fixed support at one side of the frame for the coating device, a movable supporting device at the other side of the frame for the coating device, and means for feeding coating from the receptacle to the coating device.

4. In coating mechanism for tiles and the like, in combination, a frame, feeding means thereon for objects such as tiles, a coating device, a fixed support for said device at one side of the frame, and a movable support for said device at the other side of the frame.

5. In coating mechanism for tiles and the like, in combination, a frame, feeding means thereon for objects such as tiles, a coating device, a fixed support for said device at one side of the frame, a retractable support for the support of the coating device at the other side of the frame, and a latch for holding the retractable support in engagement with the coating device.

6. In coating mechanism for tiles and the like, in combination, a frame, feeding means thereon for tiles or the like, a coating roll, a fixed bearing on the frame for the roll at one side thereof, and a movable bearing on the frame for the roll at the other side thereof.

7. In coating mechanism for tiles and the like, in combination, a frame, feeding means thereon for tiles or the like, a coating roll, a fixed bearing on the frame for the roll at one side thereof, movable bearing on the frame for the roll at the other side thereof, and a latch for holding the movable bearing in engagement with the roll.

8. In coating mechanism for tiles and the like, in combination, a frame, feeding means thereon for tiles or the like, a coating roll, a driving spindle engaging the roll at one end, a fixed bearing for said spindle, a bearing near the other end of the roll, and a retractable spindle in said last named bearing adapted to engage the adjacent end of the roll.

9. In coating mechanism for tiles and the like, in combination, a frame, feeding means thereon for tiles or the like, a coating roll, a fixed bearing near one end thereof, a drive spindle mounted in said bearing and engaging the roll, another bearing near the other end of the roll, an idler spindle mounted in said bearing and detachably engaging the adjacent end of the roll, and means for normally holding the idler spindle in engagement with the roll.

10. In coating mechanism for tiles and the like, in combination, a frame, feeding means thereon for tiles or the like, a coating roll, a fixed bearing near one end thereof, a drive spindle mounted in said bearing and engaging the roll, another bearing near the other end of the roll, an idler spindle mounted in said bearing and detachably engaging the adjacent end of the roll, means for normally holding the idler spindle in engagement with the roll, and means for retracting the idler spindle.

11. In coating mechanism for tiles and the like, in combination, a frame, feeding means thereon for tiles or the like, a coating roll, a fixed bearing near one end of the roll, a drive spindle therein detachably engaging the roll, a movable bearing near the other end of the roll, and an idler spindle in said bearing detachably engaging the roll.

12. In coating mechanism for tiles and the like, in combination, a frame, feeding means thereon for tiles or the like, a coating roll, a fixed bearing near one end of the roll, a drive spindle therein detachably engaging the roll, a movable bearing near the other end of the roll, an idler spindle in said bearing detachably engaging the roll, and a latch for securing the movable bearing in active position.

13. In coating mechanism for tiles and the like, in combination, a frame, feeding means thereon for tiles or the like, a coating roll, a fixed bearing near one end of the roll, a drive spindle in said bearing detachably engaging the roll, a movable bearing near the other end of the roll, a retractable latch for securing the bearing in active position, an idler spindle in said bearing detachably engaging the roll, and means for retracting said spindle with relation to the bearing.

14. In coating mechanism for tiles and the like, in combination, a frame, feeding means thereon for tiles and the like, a beam connected to the frame at one end and free at the other, a coating device below the beam, a support detachably engaging the coating device near the connected end of the beam, and a movable support carried by the free end of the beam and detachably engaging the coating device.

15. In coating mechanism for tiles and the like, in combination, a frame, feeding means thereon for tiles and the like, a beam connected to the frame at one end and free at the other, a coating device below the beam, a support detachably engaging the coating device near the connected end of the beam, a movable support carried by the free end of the beam and detachably engaging the coating device, and a latch for securing the movable support in active position.

16. In coating mechanism for tiles and the like, in combination, a frame, feeding means thereon for tiles and the like, a beam connected at one of its ends to the frame and free at the other end, a coating roll below the beam, a rotary mounting near the connected end of the beam and detachably engaging the coating roll, a movable member carried by the free end of the beam, and a rotary mounting carried by said member and detachably engaging the coating roll.

17. In coating mechanism for tiles and the like, in combination, a frame, feeding means thereon for tiles and the like, a beam connected at one of its ends to the frame and free at the other end, a coating roll below the beam, a rotary mounting near the connected end of the beam and detachably engaging the coating roll, a movable member carried by the free end of the beam, and a rotary mounting carried by said member and detachably engaging the coating roll, and a latch for holding said movable member in active position.

18. In coating mechanism for tiles and the like, a frame, feeding means thereon, a beam attached to the frame at one end and free at the other, a coating roll below the beam, a fixed bearing near the attached end of the beam, a drive spindle in the bearing detachably engaging one end of the roll, a movable head carried by the free end of the beam, a bearing therein, and an idler spindle in the bearing adapted to detachably engage the adjacent end of the roll.

19. In coating mechanism for tiles and the like, a frame, feeding means thereon, a beam attached to the frame at one end and free at the other, a coating roll below the beam, a fixed bearing near the attached end of the beam, a drive spindle in the bearings detachably engaging one end of the roll, a movable head carried by the free end of the beam, a bearing therein, an idler spindle in the bearing adapted to detachably engage the adjacent end of the roll, and a latch for securing the head in active position.

20. In coating mechanism for tiles and the like, a frame, feeding means thereon, a beam attached to the frame at one end and free at the other, a coating roll below the beam, a fixed bearing near the attached end of the beam, a drive spindle in the bearing detachably engaging one end of the roll, a movable head carried by the free end of the beam, a bearing therein, an idler spindle in the bearing adapted to detachably engage the adjacent end of the roll, and means for retracting said idler spindle in its bearing.

21. In coating mechanism for tiles and the like, a frame, feeding means thereon, a beam attached to the frame at one end and free at the other, a coating roll below the beam, a fixed bearing near the attached end of the beam, a drive spindle in the bearings detachably engaging one end of the roll, a movable head carried by the free end of the beam, a bearing therein, an idler spindle in the bearing adapted to detachably engage the adjacent end of the roll, a latch for securing the head in active position, and means for retracting said idler spindle in its bearing.

22. In a coating machine for tiles and the like, the combination of a coating tub, a frame having a front opening to admit the tub, a coating device, tile-conveying means, coating-feeding means within the tub for supplying coating to said device, a support at the rear of the frame detachably engaging said feeding means, and a movable support at the front of the frame detachably engaging the feeding means, whereby said feeding means may be withdrawn with the tub when released from said movable support.

23. In a coating machine for tiles and the like, the combination of a coating tub, a frame having a front opening to admit the tub, a coating device, tile-conveying means, coating-feeding means within the tub for supplying coating to said device, driving means near the rear side of the frame detachably engaging said feeding means, and a movable supporting device near the front side of the frame detachably engaging said feeding means.

24. In a coating machine for tiles and the like, the combination of a coating tub, a frame having a front side opening to admit the tub, a coating device and tile-conveying means carried by the frame, an oscillating coating-feed device within the tub, a bearing in the frame near the rear side thereof, a drive spindle in the bearing detachably engaging said coating-feed device, a movable bearing near the front of the frame, and an idler spindle in said bearing detachably engaging said coating-feed device.

25. In a coating machine for tiles and the like, the combination of a coating tub, a frame having a front side opening to admit the tub, a coating device and tile-conveying means carried by the frame, an oscillating coating-feed device within the tub, a bearing in the frame near the rear side thereof, a drive spindle in the bearing detachably engaging said coating-feed device, a movable bearing near the front of the frame and an idler spindle in said bearing detachably engaging said coating-feed device, and a latch for securing said movable bearing in active position.

26. In a machine for coating tiles and the like, the combination of a frame, a coating device, coating supply means, a belt pulley mounted in fixed bearings near the coating device, a slide, a belt pulley carried by the slide adjacent to the pulley first mentioned, a head movable upon the slide, a belt pulley carried by said head adjacent to the pulleys first and second mentioned, means for adjusting the position of the slide on the frame, means for adjusting the position of the head in relation to the slide, a tile-feed belt passing around said pulleys, and another pulley carrying the rear end of the belt.

27. In a coating machine for tiles and the like, the combination of a frame, two separated beams thereon, attached to the frame at one side and free at the other, coating devices, one adjacent to each beam, a support for each coating device adjacent to the attached end of the beam and detachably engaging the coating device, a movable support carried by the free end of each beam and detachably engaging the corresponding coating device, a conveyer intermediate the coating devices, a coating receptacle, and coating supply means for supplying the coating devices from the receptacle.

28. In a coating machine for tiles and the like, the combination of a frame, two separated beams thereon attached to the frame at one side and free at the other, coating devices, one adjacent to each beam, a support for each coating device adjacent to the attached end of the beam and detachably engaging the coating device, a movable support carried by the free end of each beam and detachably engaging the corresponding coating device, a conveyer intermediate the coating devices, a coating tub in the frame below said coating devices, the frame being provided with a side opening for insertion and removal of the tub, and coating supply means within the tub for delivering coating material to said devices.

29. In a coating machine for tiles and the like, the combination of a frame, two separated beams thereon attached to the frame at one side and free at the other, coating devices, one adjacent to each beam, a support for each coating device adjacent to the attached end of the beam and detachably engaging the coating device, a movable support carried by the free end of each beam and detachably engaging the corresponding coating device, a conveyer intermediate the coating devices, a coating tub in the frame below said coating devices, the frame being provided with a side opening for insertion and removal of the tub, an oscillating coating-feeder within the tub for supplying said coating devices, a drive spindle for said feeder mounted in a fixed bearing near the rear side of the frame and detachably engaging said feeder, a movable bearing at the front side of the frame, and an idler spindle carried by said bearing and detachably engaging said feeder.

30. In a coating machine for tiles and the like, the combination of the end frame members, a rear frame member connecting said end members, a top plate connecting said end members, the frame being open at the front, a coating receptacle carrying coating housings accommodated by spaces in said top plate, a truck movably mounted in the base of the frame and carrying said coating receptacle, means for interlocking said coating housings with the frame, a coating feeder within said receptacle, supports for said feeder carried by said receptacle, driving means for said feeder carried by the frame, and means for detachably connecting said feeder with said driving means.

31. In a coating machine for tiles and the like, the combination of the end frame members, a rear frame member connecting said end members, a top plate connecting said end members, the frame being open at the front, a coating receptacle carrying coating housings accommodated by spaces in said top plate, a truck movably mounted in the base of the frame and carrying said coating receptacle, means for running said truck in and out, means for interlocking said coating housings with the frame, a coating feeder within said receptacle, supports for said feeder carried by said receptacle, driving means for said feeder carried by the frame, and means for detachably connecting said feeder with said driving means.

32. In a coating machine for tiles and the like, the combination of a frame open at the front and including a top plate, a coating tub within the frame removable at the front, coating housings carried by the tub, means for interlocking said housing with the frame, a coating-feeder within the tub, a drive spindle for the feeder carried by the frame at the rear, a movable drive clutch for the feeder, a movable bearing at the front of the frame, an idler spindle carried by said bearing for the feeder, and a connection between said movable bearing and said clutch whereby the clutch is disengaged when the bearing is moved to free the feeder from its idler spindle.

33. In a coating machine for tiles and the like, the combination of a frame open at the front and including a top plate, a coating tub within the frame removable at the front, coating housings carried by the tub, means for interlocking said housings with the frame, a coating roll carried by each housing, driving means for the rolls carried by the frame at the rear, and movable means carried by the frame at the front for connecting said rolls with the driving means, a coating feeder within the tub, a drive spindle for the feeder carried by the frame at the rear, a movable drive clutch for the feeder, a movable bearing at the front of the frame, an idler spindle carried by said bearing for the feeder, and a connection between said movable bearing and said clutch whereby the clutch is disengaged when the bearing is moved to free the feeder from its idler spindle.

34. In a coating machine for tiles and the like, the combination of a frame, a coating roll, coating supply means, tile feeding means, a tilting roll adjacent to the coating roll, and means for adjusting the tilting roll.

35. In a coating machine for tiles and the like, the combination of a frame, a coating roll, coating supply means, tile feeding means, a tilting roll adjacent to the coating roll, a movable bearing at each end of the tilting roll, and means for simultaneously adjusting the position of said bearings.

36. In a coating machine for tiles and the like, the combination of a frame, a coating roll, coating supply means, tile feeding means, and adjustors coöperating with the coating roll, each adjuster comprising an adjuster roll, a retractable carrier therefor, and means for simultaneously retracting the adjusters.

37. In a coating machine for tiles and the like, the combination of a frame, a coating roll, coating supply means, tile feeding means, adjusters coöperating with the coating roll, each adjuster comprising an adjuster roll, a retractable carrier therefor, means for simultaneously retracting the adjusters, a movable member carried by the frame for holding the coating roll in position, and means by which movement of said member retracts said adjusters.

38. In a coating machine for tiles and the like, the combination of a frame open at the front and including a top plate, a coating tub movable in and out of the frame through the front, coating housings carried by the tub and accommodated by spaces in said top plate, the housings being provided with sockets, and bolts carried by the frame to engage said sockets.

39. In a coating machine for tiles and the like, the combination of a frame open at the front and including a top plate, a coating tub movable in and out of the frame through the front, coating housings carried by the tub and accommodated by spaces in said top plate, the housings being provided with sockets, and bolts carried by the frame to engage said sockets, a coating-feeder within the tub, a movable locking member carried by the frame for securing the feeder in operative position in the frame, and means by which movement of said locking member operates said bolts.

40. In a coating machine for tiles and the like, the combination of a frame including a top plate and open at the front, a coating tub movable in and out of the frame through the front, coating housings carried by the tub, a coating device in each housing, said top plate being provided with openings to accommodate said housings, coöperating guides carried by the frame and housings for locating the latter in the frame, and movable locking bolts carried by the frame coöperating with sockets on the housings to lock the latter in the frame.

41. In a coating machine for tiles and the like, the combination of a frame including a top plate open at the front, a coating tub movable in and out of the frame through the front, coating housings carried by the tub, a coating device in each housing, said top plate being provided with openings to accommodate said housings, coöperating guides carried by the frame and housings for locating the latter in the frame, movable locking bolts carried by the frame coöperating with sockets on the housings to lock the latter in the frame, an oscillating coating-feeder within the tub, driving means for the feeder carried by the frame, a swinging member on the frame for locking the feeder in operative position in connection with its driving means, and a connection between said swinging member and said bolts for operating the latter.

42. In coating mechanism for tiles and the like, the combination of a frame, a coating tub removably placed therein, a driving member on the frame, a driven member idly supported by the tub and adapted to be brought in contact with the driving member when the tub is in operative position, tub locking means for securing the tub in position in the frame, movable locking means for said driven member to lock it in operative relation to its driving member, and interacting means between said locking devices.

FREDERICK E. GOLDSMITH.

Witnesses:
E. A. BELDEN,
ETHEL KIMBROUGH.

Copies of this patent may be obtained for five cents each, by addressing the "Commissioner of Patents, Washington, D. C."